(12) United States Patent
He

(10) Patent No.: US 11,257,403 B2
(45) Date of Patent: Feb. 22, 2022

(54) FOLDABLE DISPLAY DEVICE

(71) Applicant: Shanghai Tianma Micro-Electronics Co., Ltd., Shanghai (CN)

(72) Inventor: Yongxin He, Shanghai (CN)

(73) Assignee: SHANGHAI TIANMA MICRO-ELECTRONICS CO., LTD., Shanghai (CN)

(*) Notice: Subject to any disclaimer, the term of this patent is extended or adjusted under 35 U.S.C. 154(b) by 0 days.

(21) Appl. No.: 16/917,530

(22) Filed: Jun. 30, 2020

(65) Prior Publication Data
US 2021/0280095 A1 Sep. 9, 2021

(30) Foreign Application Priority Data
Mar. 6, 2020 (CN) .......................... 202010152831.6

(51) Int. Cl.
G09F 9/30 (2006.01)
G06F 1/16 (2006.01)
H04M 1/02 (2006.01)

(52) U.S. Cl.
CPC ............ *G09F 9/301* (2013.01); *G06F 1/1616* (2013.01); *G06F 1/1641* (2013.01); *G06F 1/1652* (2013.01); *G06F 1/1684* (2013.01); *H04M 1/0268* (2013.01); *H04M 1/0214* (2013.01); *H04M 1/0216* (2013.01)

(58) Field of Classification Search
CPC combination set(s) only.
See application file for complete search history.

(56) References Cited

U.S. PATENT DOCUMENTS

| 6,016,176 A * | 1/2000 | Kim .................. G02F 1/133305 349/84 |
| 10,606,318 B1 * | 3/2020 | Lin ........................ G06F 1/1641 |
| 10,921,864 B2 * | 2/2021 | Choi ....................... G09F 9/301 |
| 2007/0004475 A1 * | 1/2007 | Kuo ..................... H04M 1/0214 455/575.3 |
| 2007/0097014 A1 * | 5/2007 | Solomon ............... G06F 1/1662 345/1.1 |

(Continued)

FOREIGN PATENT DOCUMENTS

| CN | 106444974 A | 2/2017 |
| CN | 208806016 U | 4/2019 |

(Continued)

*Primary Examiner* — Lisa Lea-Edmonds
(74) *Attorney, Agent, or Firm* — Alston & Bird LLP

(57) ABSTRACT

A foldable display device includes a flexible display screen, a foldable assembly and a non-display function assembly. The states of the foldable display device include an unfolded state and a folded state. In the unfolded state, a first support plate and a second support plate are disposed on two opposite sides of a connector respectively, and the flexible display screen covers the first support plate, the connector, the second support plate and the non-display function assembly. In the folded state, a first part and a second part of the flexible display screen overlap, the first support plate and the second support plate overlap and are disposed between the first part and the second part. A part of the flexible display screen on the side of the second support plate which is away from the first support plate does not cover the non-display function assembly.

16 Claims, 10 Drawing Sheets

(56) References Cited

U.S. PATENT DOCUMENTS

| | | | | |
|---|---|---|---|---|
| 2013/0120912 | A1* | 5/2013 | Ladouceur | G06F 1/1641 |
| | | | | 361/679.01 |
| 2015/0378557 | A1* | 12/2015 | Jeong | H04M 1/0214 |
| | | | | 715/835 |
| 2017/0069299 | A1* | 3/2017 | Kwak | G06F 3/147 |
| 2018/0164852 | A1* | 6/2018 | Lim | H04M 1/0237 |
| 2018/0198896 | A1* | 7/2018 | Kang | H04M 1/0268 |
| 2018/0375975 | A1* | 12/2018 | Kikuchi | G06F 1/1681 |
| 2018/0375976 | A1* | 12/2018 | Kikuchi | H04M 1/0247 |
| 2019/0028579 | A1* | 1/2019 | Cho | G06F 1/1616 |
| 2019/0306290 | A1* | 10/2019 | Lee | H04M 1/0214 |
| 2019/0320048 | A1* | 10/2019 | Yang | H04M 1/0247 |
| 2020/0174522 | A1* | 6/2020 | Lim | A45C 13/20 |
| 2020/0241594 | A1* | 7/2020 | Cavallaro | H04M 1/0268 |
| 2020/0257334 | A1* | 8/2020 | Han | H04M 1/0268 |
| 2021/0058502 | A1* | 2/2021 | Liao | H04M 1/0214 |
| 2021/0116963 | A1* | 4/2021 | Moon | G06F 1/1635 |

FOREIGN PATENT DOCUMENTS

| | | | |
|---|---|---|---|
| CN | 110083209 | A | 8/2019 |
| CN | 110290235 | A | 9/2019 |
| CN | 110493387 | A | 11/2019 |
| CN | 209787222 | U | 12/2019 |

* cited by examiner

FOLDABLE DISPLAY DEVICE

CROSS-REFERENCE TO RELATED APPLICATION

This application claims priority to a Chinese patent application No. CN202010152831.6 filed on Mar. 6, 2020 at the CNIPA, the content of which is incorporated herein by reference in its entirety.

TECHNICAL FIELD

The present disclosure relate to the field of display technologies and, in particular, to a foldable display device.

BACKGROUND

Currently, the full screen display is a large part of the consumer electronics market. A full screen means a display screen with a high screen-to-body ratio. Further improving the screen-to-body ratio of the full screen displays is a desired development area of the display industry.

Thus, the foldable full screen technology emerges with time. At present, a foldable smart phone that can be fold and unfold is available. The smart phone when folded has a smaller size and is convenient to carry. The unfold smart phone has a larger display size though.

However, the camera module in an existing foldable display device is disposed fully on one edge of the whole display device and occupies a larger bezel area. Thus, a higher screen-to-body ratio cannot be achieved.

SUMMARY

Embodiments of the present disclosure provide a foldable display device to achieve a higher screen-to-body ratio.

The foldable display device provided in an embodiment of the present disclosure includes a flexible display screen, a foldable assembly and a non-display function assembly. The flexible display screen includes a first part, a second part and a bendable part. The bendable part is disposed between the first part and the second part. The foldable assembly includes a first support plate, a second support plate and a connector. The first support plate supports the first part and the second support plate supports the second part. The first support plate is connected to the second support plate through the connector. The connector is a folding shaft and the extension direction of the folding shaft is a first direction. The non-display function assembly is disposed on a side of the second support plate away from the connector.

The working states of the foldable display device include an unfolded state and a folded state. In the unfolded state, the first support plate and the second support plate are disposed on two opposite sides of the connector respectively, and the flexible display screen covers the first support plate, the connector, the second support plate and the non-display function assembly. In the folded state, the first part and the second part of the flexible display screen overlap, the first support plate and the second support plate overlap and are disposed between the first part and the second part, and a part of the flexible display screen on a side of the second support plate which is away from the first support plate does not cover the non-display function assembly.

In the embodiments of the present disclosure, the foldable display device includes the foldable assembly, the non-display function assembly and the flexible display screen disposed on the foldable assembly. The first support plate of the foldable assembly is connected to the second support plate through the connector. The connector is the folding shaft. The folding shaft structure of the connector has the advantages of simple design, simple assembly process, long life and low cost. The non-display function assembly is disposed on the side of the second support plate away from the connector. In the unfolded state, the first support plate and the second support plate are disposed on two opposite sides of the connector respectively, so that the surface of the foldable assembly is a plane. The flexible display screen covers the first support plate, the connector, the second support plate and the non-display function assembly, so that the display surface of the flexible display screen is flat, the non-display function assembly does not occupy the bezel area, and thus full-screen display is achieved and the screen-to-body ratio is improved. In the folded state, the part of the flexible display screen on the side of the second support plate which is away from the first support plate does not cover the non-display function assembly, and thus it is easy for a user to operate the non-display function assembly.

BRIEF DESCRIPTION OF DRAWINGS

To explain the solution of the embodiments of the present disclosure or the solution of the related art more clearly, the drawings needed in the description of the embodiments or in the related art will be briefly described hereinafter. Apparently, though the drawings in the following description are some embodiments of the present disclosure, for those skilled in the art, the drawings may be developed and extended to other structures and drawings according to the basic concepts of the component structures, driving methods and manufacturing methods revealed and prompted by the embodiments of the present disclosure. Such structures and drawings are no doubt within the scope of the appended claims of the present disclosure.

DETAILED DESCRIPTION

This embodiment of the present disclosure provides a foldable display device. The foldable display device provided by this embodiment includes a flexible display screen, a foldable assembly and a non-display function assembly. The flexible display screen includes a first part, a second part and a bendable part. The bendable part is disposed between the first part and the second part. The foldable assembly includes a first support plate, a second support plate and a connector. The first support plate supports the first part and the second support plate supports the second part. The first support plate is connected to the second support plate through the connector. The connector is a folding shaft and the extension direction of the folding shaft is a first direction. The non-display function assembly is disposed on a side of the second support plate away from the connector. The working states of the foldable display device include an unfolded state and a folded state. In the unfolded state, the first support plate and the second support plate are disposed on two opposite sides of the connector respectively, and the flexible display screen covers the first support plate, the connector, the second support plate and the non-display function assembly. In the folded state, the first part and the second part of the flexible display screen overlap, the first support plate and the second support plate overlap and are disposed between the first part and the second part, and a part of the flexible display screen on a side of the second support plate which is away from the first support plate does not cover the non-display function assembly.

Figure 1:
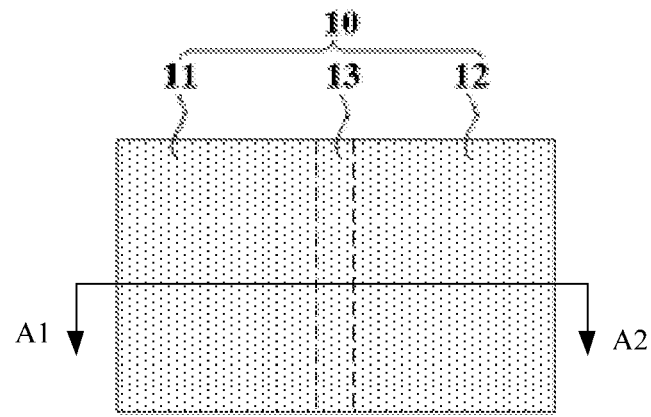
FIG. 1 is a top view of a foldable display device according to one embodiment of the present disclosure.

FIG. 1 is a top view of the flexible display screen in the unfolded state. A flexible display screen 10 is a flexible organic light-emitting display screen. In other embodiments, the flexible display screen 10 may be a quantum dot flexible display screen or an electronic paper flexible display screen. The type of the flexible display screen 10 is not limited in the present disclosure. Any type of flexible display screen falls into the scope of the present disclosure. The flexible display screen 10 is provided with all structures able to achieve the flexible display function. For example, the flexible display screen 10 includes at least an array substrate, an emitting layer and an encapsulation layer. Here, the flexible display screen 10 is divided into three parts: a first part 11, a second part 12 and a bendable part 13. The bendable part 13 is disposed between the first part 11 and the second part 12. The flexible display screen 10 may be bent at the bendable part 13.

Figure 2:
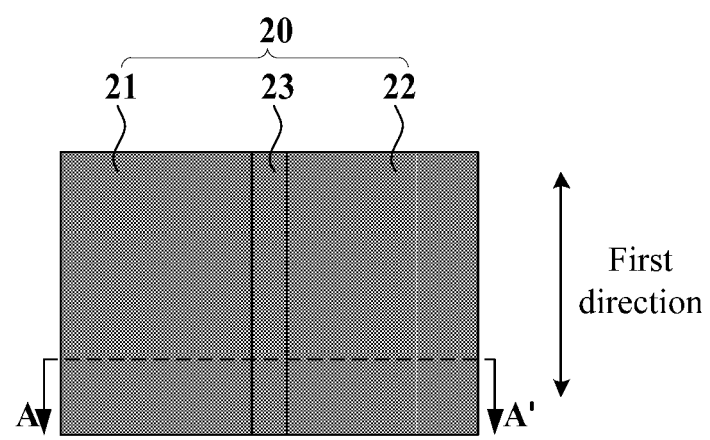
FIG. 2 is a diagram of a foldable assembly in a foldable display device according to another embodiment of the present disclosure.
Figure 3:
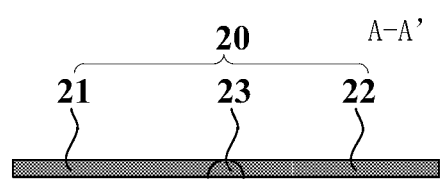
FIG. 3 is a cross sectional view along A-A' line of FIG. 2.

FIG. 2 is a diagram of the foldable assembly and FIG. 3 is a cross sectional view along A-A' of FIG. 2. FIG. 2 shows a foldable assembly 20 in the unfolded state and FIG. 3 shows a side view of the foldable assembly 20. In an embodiment, the foldable assembly 20 includes a first support plate 21, a second support plate 22 and a connector 23. The first support plate 21 is connected to the second support plate 22 through the connector 23. The connector 23 is a folding shaft and the extension direction of the folding shaft is a first direction. Here, the folding shaft connects the first support plate 21 and the second support plate 22. Thus, the first support plate 21 rotates around the connector 23 and relative to the second support plate 22, so that the first support plate 21 and the second support plate 22 may be folded, that is, closed at an included angle of 0°; or so that the first support plate 21 and the second support plate 22 may be unfolded, that is, flattened at an included angle of 180°. In other embodiments, the first support plate 21 rotates relative to the second support plate 22 such that the included angle between the first support plate 21 and the second support plate 22 is any angle of 0° to 180°.

Figure 4:
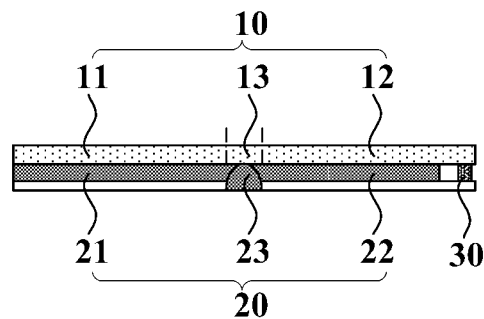
FIG. 4 is a cross sectional view of a foldable display device in an unfolded state along A1-A2 line of FIG. 1.
Figure 5A:
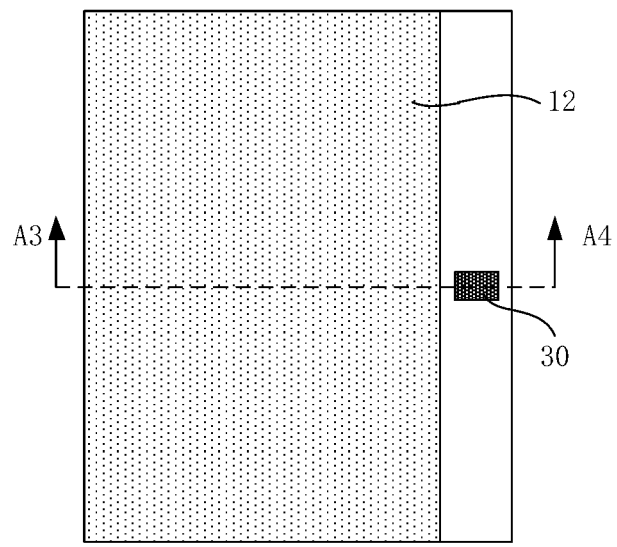
FIG. 5A is a top view of a foldable display device according to one embodiment of the present disclosure.
Figure 5B:
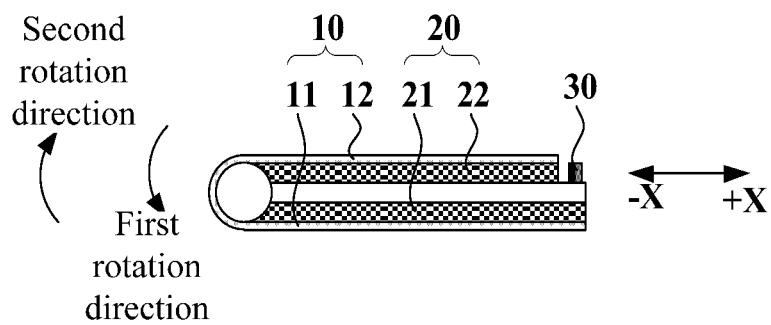
FIG. 5B is a cross sectional view of a foldable display device in a folded state along A3-A4 line of FIG. 5A.

FIG. 4 is a cross sectional view of a foldable display device in an unfolded state along A1-A2 line of FIG. 1. FIG. 5A is a top view of a foldable display device according to one embodiment of the present disclosure. FIG. 5B is a cross sectional view of a foldable display device in a folded state along A3-A4 line of FIG. 5A. The foldable display device includes the foldable assembly 20 and the flexible display screen 10 disposed on the foldable assembly 20. The foldable assembly 20 is an outward-bending structure and the flexible display screen 10 is disposed on the outward-bending surface of the foldable assembly 20. The first support plate 21 of the foldable assembly 20 supports the first part 11 of the flexible display screen 10 and the second support plate 22 of the foldable assembly 20 supports the second part 12 of the flexible display screen 10. The foldable display device further includes a non-display-function assembly 30. The non-display-function assembly 30 is disposed on a side of the second support plate 22 away from the connector 23. In this case, the non-display function assembly 30 is adjacent to or spaced apart from a sidewall of the second support plate 22. In an embodiment, the non-display function assembly 30 includes at least an image acquisition unit. In other embodiments, the non-display function assembly 30 further includes an earpiece, an optical sensor and a distance sensor.

The working states of the foldable display device include the unfolded state and the folded state.

FIG. 4 shows the foldable display device in the unfolded state. In the unfolded state, the first support plate 21 and the second support plate 22 are disposed on two opposite sides of the connector 23 respectively, and the flexible display screen 10 covers the first support plate 21, the connector 23, the second support plate 22 and the non-display-function assembly 30. In the unfolded state, the first support plate 21, the connector 23 and the second support plate 22 have surfaces in the same plane. In this case, the flexible display screen 10 attached to the foldable assembly 20 is also in the unfolded state, so the display surface of the flexible display screen 10 is flat. In the unfolded state, the flexible display screen 10 covers the first support plate 21, the connector 23, the second support plate 22 and the non-display-function assembly 30, so the non-display-function assembly 30 is not disposed on the edge of the flexible display screen 10 and do not occupy larger bezel area. Therefore, a full screen is achieved and the user experience is improved.

FIG. 5B shows the foldable display device in the folded state. In the folded state, the first part 11 and the second part 12 of the flexible display screen 10 overlap, the first support plate 21 and the second support plate 22 overlap and are disposed between the first part 11 and the second part 12, and a part of the flexible display screen 10 on a side of the second support plate 22 which is away from the first support plate 21 does not cover the non-display-function assembly 30. In the folded state, the first support plate 21 rotates around the connector 23 and relative to the second support plate 22, so that the first support plate 21 and the second support plate 22 overlap. The bendable part 13 of the flexible display screen 10 corresponds to the position of the connector 23 to support the bendable part 13, so the folded flexible display screen 10 is U-shaped, and the first support plate 21 and the second support plate 22 are inside the U-shaped flexible display screen 10. In the process of folding the foldable display device, a part of the flexible display screen 10 on the foldable assembly 20 and disposed on the second support plate 22 slides relative to the foldable assembly 20, so a part of the folded flexible display screen 10 on a side of the second support plate 22 which is away from the first support plate 21 does not cover the non-display-function assembly 30. Thus, it is easy for a user to operate the non-display function assembly 30.

Understandably, in the folded state, the display surface of the second part 12 of the flexible display screen 10 may be considered as the front display surface of the foldable display device. In this case, the non-display-function assembly 30 is exposed so that the user operation is convenient. The display surface of the first part 11 of the flexible display screen 10 may be considered as the back display surface of the foldable display device and the back display surface is flat.

In this embodiment of the present disclosure, the foldable display device includes the foldable assembly 20, the non-display-function assembly 30 and the flexible display screen 10 disposed on the foldable assembly 20. The first support plate 21 of the foldable assembly 20 is connected to the second support plate 22 through the connector 23. The connector 23 is the folding shaft. The folding shaft structure of the connector 23 has the advantages of simple design, simple assembly process, long life and low cost. The non-display-function assembly 30 is disposed on a side of the second support plate 22 away from the connector 23. In the unfolded state, the first support plate 21 and the second support plate 22 are disposed on two opposite sides of the connector 23 respectively, so that the surface of the foldable assembly 20 is a plane; and the flexible display screen 10 covers the first support plate 21, the connector 23, the second support plate 22 and the non-display-function assembly 30, so that the display surface of the flexible display screen is flat, the non-display-function assembly 30 does not occupy the bezel area, full-screen display is achieved, and the screen-to-body ratio is improved. In the folded state, a part of the flexible display screen 10 on a side of the second support plate 22 which is away from the first support plate 21 does not cover the non-display-function assembly 30, and thus it is easy for a user to operate the non-display function assembly 30.

Exemplarily, based on the above solution, in an embodiment, the first part 11 is secured to the first support plate 21. In a process of switching the foldable display device between the unfolded state and the folded state, the second part 12 slides relative to the second support plate 22 and the sliding direction is perpendicular to the first direction.

As shown in FIG. 4, the first part 11 of the flexible display screen 10 is secured to the first support plate 21 of the foldable assembly 20, and the second part 12 of the flexible display screen 10 is disposed on but not secured to the second support plate 22 of the foldable assembly 20. In an embodiment, an adhesive layer is used for attaching the first part 11 to the first support plate 21 to achieve the fixed connection. Of course, the fixed connection manner is not limited to this and is not limited in detail herein.

As shown in FIG. 5B, when the first support plate 21 rotates around the connector 23 in a rotation direction, the foldable display device is switched between the unfolded state and the folded state. The first part 11 of the flexible display screen 10 and the first support plate 21 rotate as a whole. The second part 12 of the flexible display screen 10 slides relative to the second support plate 22 of the foldable assembly 20 and the sliding direction is perpendicular to the first direction.

In an embodiment, when the foldable display device is switched from the unfolded state to the folded state, the first support plate 21 rotates around the connector 23 and relative to the second support plate 22 in a first rotation direction to drive the second part 12 of the flexible display screen 10 to slide relative to the second support plate 22 of the foldable assembly 20 in the −X direction. When the foldable display device is switched from the folded state to the unfolded state, the first support plate 21 rotates around the connector 23 and relative to the second support plate 22 in a second rotation direction, and the second part 12 of the flexible display screen 10 slides relative to the second support plate 22 of the foldable assembly 20 in the +X direction.

In this embodiment, the second part 12 of the flexible display screen 10 is not secured to the second support plate 22. Thus, in the process of folding or unfolding the foldable display device, the bendable part 13 of the flexible display screen 10 does not change significantly in size, that is, is not stretched. Therefore, the connector 23 may have no bending compensation structure so that the connector has a simple structure, a long life and low cost.

The flexible display screen 10 has no change in the overall size in the process of being bent. When the flexible display screen 10 is folded, the second part 12 of the flexible display screen 10 slides away from the edge of the second support plate 22 and gradually moves away from the non-display-function assembly 30. After the flexible display screen 10 is folded, the non-display function assembly 30 is exposed, which is easy for a user to operate. When the flexible display screen 10 is in the unfolded state, the second part 12 of the flexible display screen 10 slides towards the edge of second support plate 22 and gradually covers the non-display function assembly 30, so that a full screen is achieved.

Exemplarily, based on the above solution, in an embodiment, the connector 23 is a rotating shaft. The first support plate 21 includes a first connecting portion, and the first connecting portion is sleeved on the rotating shaft to enable the first support plate 21 to be rotatable around the rotating shaft, and/or the second support plate 22 includes a second connecting portion and the second connecting portion is sleeved on the rotating shaft to enable the second support plate 22 to be rotatable around the rotating shaft.

Figure 6:
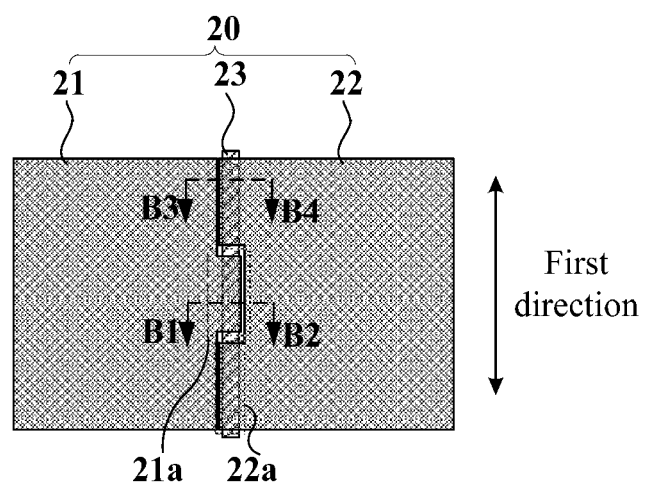
FIG. 6 is a diagram of a foldable assembly in a foldable display device according to an embodiment of the present disclosure.
Figure 7:
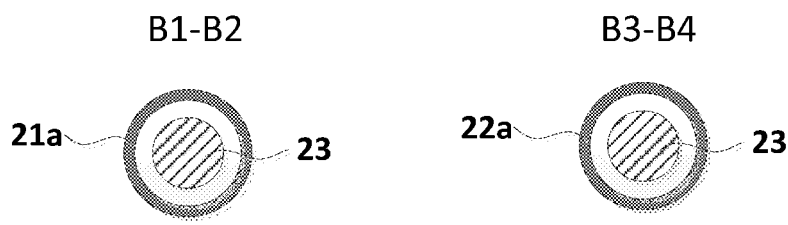
FIG. 7 illustrates a cross sectional view along B1-B2 line of FIG. 6 and a cross sectional view along B3-B4 line of FIG. 6.

As shown in FIG. 6 and FIG. 7, the connector 23 is the rotating shaft and both the first support plate 21 and the second support plate 22 are sleeved on the rotating shaft 23. The first support plate 21 has a raised first connecting portion 21a. As shown in the left drawing in FIG. 7, the first connecting portion 21a is sleeved on the rotating shaft 23 to enable the first support plate 21 to be rotatable around the rotating shaft 23. The second support plate 22 has a raised second connecting portion 22a. As shown in the right drawing in FIG. 7, the second connecting portion 22a is sleeved on the rotating shaft 23 to enable the second support plate 22 to be rotatable around the rotating shaft 23. Here, the rotating shaft 23 may be fixed, the first support plate 21 rotates around the rotating shaft 23 and the second support plate 22 rotates around the rotating shaft 23, so the switch between the folded state and the unfolded state of the foldable display device is achieved. FIG. 7 illustrates a cross sectional view along B1-B2 line of FIG. 6 and a cross sectional view along B3-B4 line of FIG. 6.

Figure 8:
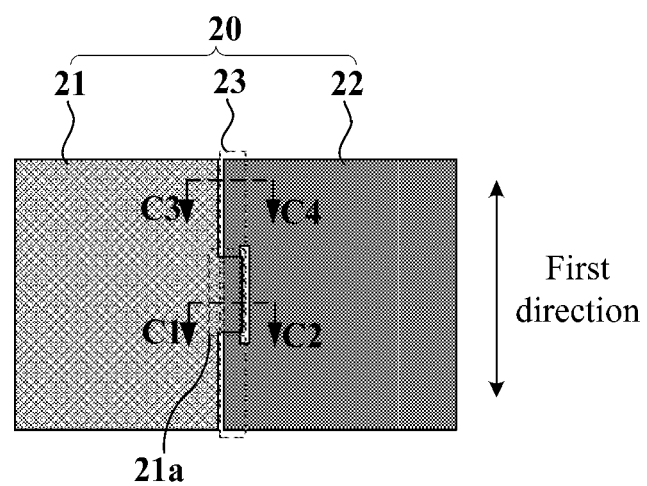
FIG. 8 is a diagram of a foldable assembly in a foldable display device according to another embodiment of the present disclosure.
Figure 9:
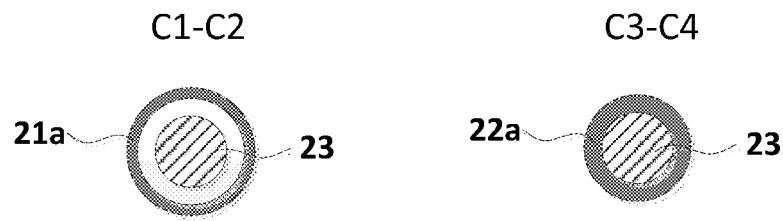
FIG. 9 illustrates a cross sectional view along C1-C2 line of FIG. 8 and a cross sectional view along C3-C4 line of FIG. 8.

As shown in FIG. 8 and FIG. 9, the difference from FIG. 6 and FIG. 7 is that, in an embodiment, the first support plate 21 is sleeved on the rotating shaft 23 as shown in the left drawing in FIG. 9 and the second support plate 22 is secured to the rotating shaft 23 without any space as shown in the right drawing in FIG. 9. When the first support plate 21 rotates around the rotating shaft 23, the first support plate 21 rotates relative to the rotating shaft 23. When the second support plate 22 rotates around the rotating shaft 23, the second support plate 22 is stationary relative to the rotating shaft 23. FIG. 9 illustrates a cross sectional view along C1-C2 line of FIG. 8 and a cross sectional view along C3-C4 line of FIG. 8.

Figure 10:
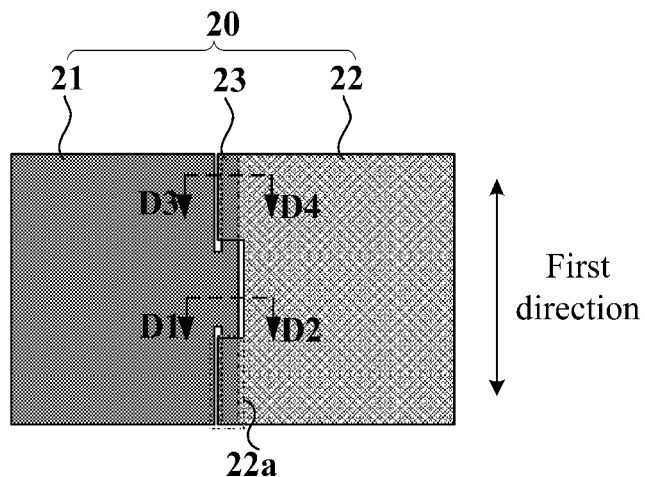
FIG. 10 is a diagram of a foldable assembly in a foldable display device according to another embodiment of the present disclosure.
Figure 11:
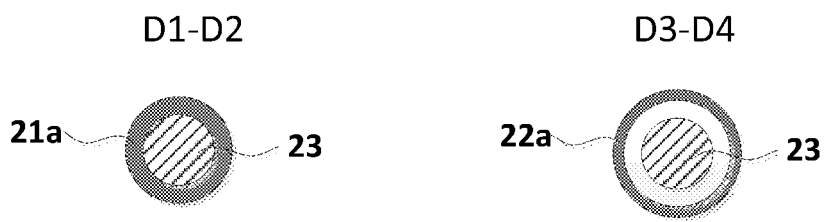
FIG. 11 illustrates a cross sectional view along D1-D2 line and a cross sectional view along D3-D4 line of FIG. 10.

As shown in FIG. 10 and FIG. 11, the difference from FIG. 8 and FIG. 9 is that, in an embodiment, the first support plate 21 is secured to the rotating shaft 23 as shown in the left drawing in FIG. 11 and the second support plate 22 is sleeved on the rotating shaft 23 with a certain space as shown in the right drawing in FIG. 11. When the first support plate 21 rotates around the rotating shaft 23, the first support plate 21 is stationary relative to the rotating shaft 23. When the second support plate 22 rotates around the rotating shaft 23, the second support plate 22 rotates relative to the rotating shaft 23. FIG. 11 illustrates a cross sectional view along D1-D2 line of FIG. 10 and a cross sectional view along D3-D4 line of FIG. 10.

As the above description, when the first support plate 21 rotates relative to the second support plate 22, the first part 11 of the flexible display screen 10 secured on the first support plate 21 is driven to rotate relative to the second part 12 of the flexible display screen 10, so that the folding or the unfolding of the foldable display device is achieved.

In this embodiment, a simple rotating shaft is used as the connector 23. The structure of the rotating shaft is simply designed and is achieved without any precision parts, so the difficulty of assembly process is reduced, the service life is improved and the production cost is reduced.

As the above description, in FIG. 6, FIG. 8 and FIG. 10, the first support plate 21 includes a first connecting portion 21a and the second support plate 22 includes two second connecting portions 22a. The arrangement order is that the first connecting portion 21a is disposed between the two second connecting portions 22a. Understandably, this is only an example of the quantity and the arrangement of the first connecting portions and the second connecting portions, the quantity of the first connecting portions and the second connecting portions may be other combinations and the position arrangement of the first connecting portions and the second connecting portions may include other ways, not limited to this. For example, the first support plate includes two first connecting portions, the second support plate includes two second connecting portions, and the first connecting portions and the second connecting portions are disposed alternately.

Understandably, in FIG. 6, the rotating shaft 23 is beyond the side surfaces of the support plates to show the position of the rotating shaft 23 clearly. In actual production, the upper and the lower end surfaces of the rotating shaft are not beyond the side surfaces of the support plates. In other embodiments, the rotating shaft is a sleeve, where the first connecting portion of the first support plate 21 is shaft-shaped and may penetrate into the sleeve, or the second connecting portion of the second support plate 22 is shaft-shaped and may penetrate into the sleeve.

Exemplarily, based on the above solution, in an embodiment, the foldable display device further includes an elastic member. In the folded state, the elastic member applies a pulling force to the second part of the flexible display screen, and the pulling force applied to the second part is toward a direction in which the second part is away from the bendable part.

Figure 12:
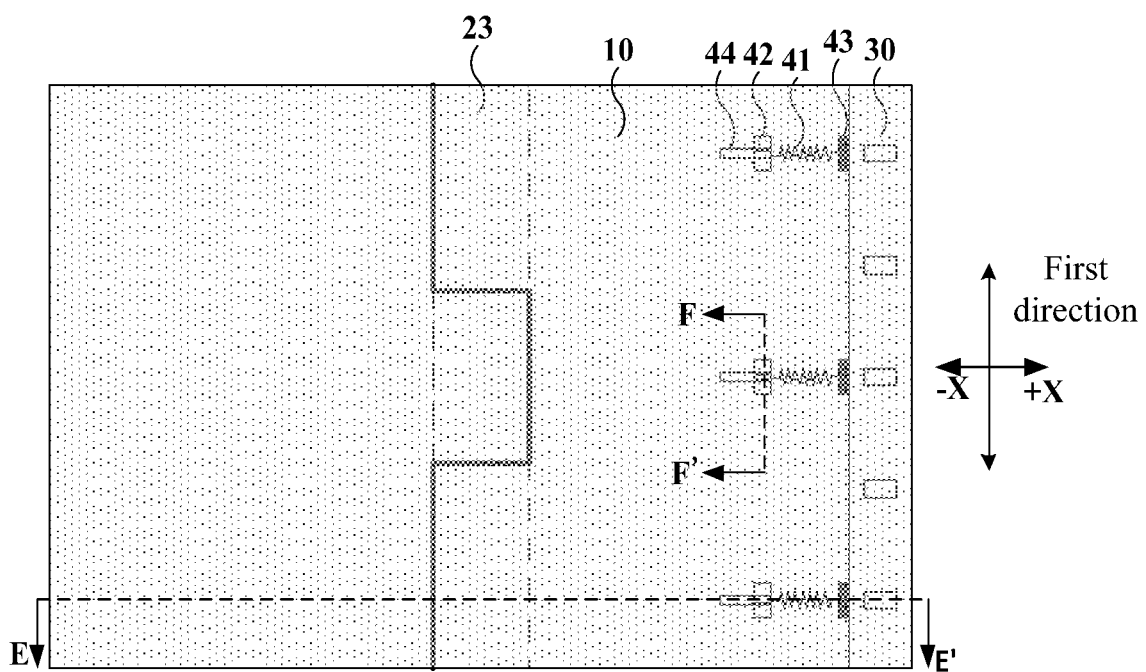
FIG. 12 is a top view of a foldable display device in an unfolded state according to an embodiment of the present disclosure.

As shown in FIG. 12, the foldable assembly is provided with elastic members 41. In an embodiment, the elastic members 41 are springs but are not limited to this. In the folded state, the first support plate 21 secured with the first part 11 (a part placed at the left side of the dotted line shown in FIG. 12) of the flexible display screen 10 rotates around the connector 23 (the part shown by the dotted box), so the second part 12 (a part placed at the right side of the dotted line shown in FIG. 12) of the flexible display screen 10 slides in the −X direction, to enable the non-display-function assembly 30 to be exposed. Here, the elastic members 41 apply a pulling force to the second part 12 of the flexible display screen 10 to ensure that the front display surface and the back display surface of the flexible display screen 10 are flat to maintain the performance of display.

The direction of the pulling force applied by the elastic members 41 to the second part of the flexible display screen 10 is opposite to the sliding direction of the second part 12, that is, the elastic members 41 apply a pulling force in the +X direction to the second part 12 of the flexible display screen 10. In the unfolded state, the elastic members 41 may be in a free state and do not stretch or squeeze the flexible display screen 10.

In an embodiment, the foldable display device includes a sliding member and a fixed member. The elastic member includes a first end and a second end opposite to each other, and the first end is connected to the sliding member and the second end is connected to the fixed member. The sliding member is disposed between the connector and the fixed member. The sliding member is secured to the second part of the flexible display screen. In the process of switching the foldable display device between the unfolded state and the folded state, the sliding member slides relative to the second support plate and the sliding direction is perpendicular to the first direction.

Figure 13:
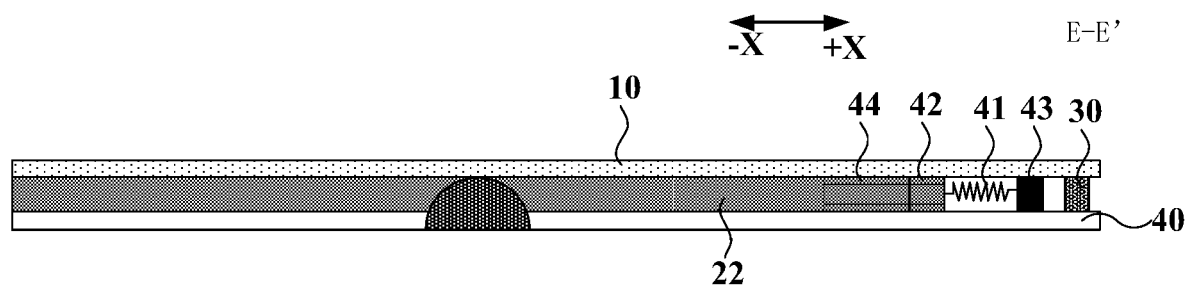
FIG. 13 is a cross sectional view of the foldable display device in an unfolded state along E-E' line of FIG. 12.
Figure 14:
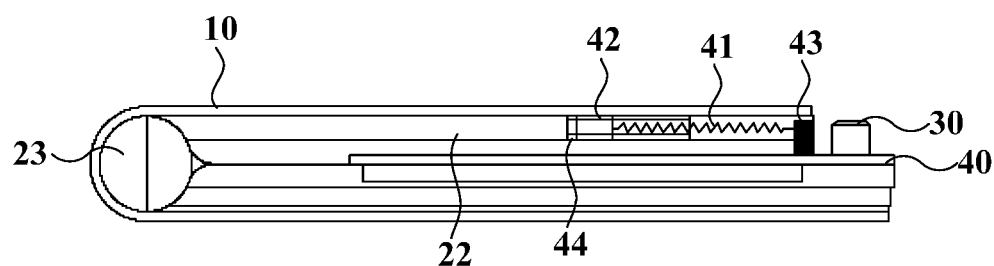
FIG. 14 is a cross sectional view of the foldable display device in a folded state of FIG. 12.

As shown in FIG. 12 and FIG. 13, FIG. 13 is a cross sectional view along E-E' of FIG. 12 and FIG. 14 is a cross sectional view of FIG. 12 in the folded state. The two sides of each elastic member 41 are respectively connected to a sliding member 42 and a fixed member 43. The positions of the fixed members 43 are invariable. Each sliding member 42 is clamped in a respective sliding rail 44 of the second support plate 22 and moves in the respective sliding rail 44. The sliding members 42 are secured to the second part 12 of the flexible display screen 10.

When the foldable display device is switched into the unfolded state, the sliding direction of the flexible display screen 10 is the +X direction. The flexible display screen 10 slides in the +X direction to drive each sliding member 42 to slide relative to the second support plate 22 through the respective sliding rail 44. In this case, the effect of the elastic members 41 connected to the sliding members 42 is to apply a pulling force in the +X direction to the sliding members 42 to make the sliding members 42 slide, so as to achieve the smoothness of sliding.

When the foldable display device is switched into the folded state, the sliding direction of the flexible display screen 10 is the −X direction. The flexible display screen 10 slides in the −X direction to drive each sliding member 42 to slide relative to the second support plate 22 through the respective sliding rail 44. In this case, the effect of the elastic members 41 connected to the sliding members 42 is to apply a pulling force in the +X direction to the sliding members 42 to cushion the sliding of the flexible display screen 10 and slow down the sliding speed of the flexible display screen 10, so as to achieve the smoothness of sliding.

The effect of the fixed members 43 is to fix the elastic members 41 and limit the positions of the displacement of the sliding members 42, so as to ensure the sliding performance of the flexible display screen 10.

In an embodiment, the foldable display device further includes a base plate. The base plate is disposed on a side of the second support plate facing away from the second part, and the fixed members are secured to the base plate.

As shown in FIG. 13 and FIG. 14, the base plate 40 is disposed on a side of the second support plate 22 facing away from the second part 12 of the flexible display screen 10. The fixed members 43 are secured to the base plate 40. The base plate 40 is used for loading the foldable assembly 20, where the base plate 40 is provided with other structures of the foldable display device, for example, a mainboard and a battery. The mainboard is electrically connected to the flexible display screen 10 through a through-hole in the support plates. In an embodiment, the second support plate 22 is secured to the base plate 40.

In this embodiment, a side surface of the base plate 40 facing away from the flexible display screen 10 is a plane. When the foldable display device is in the unfolded state, the flexible display screen 10 is a full screen and the side surface of the base plate 40 facing away from the flexible display screen 10 is a plane, that is, the back surface of the overall device is flat, so the user experience is improved.

In an embodiment, the non-display-function assembly 30 is disposed on a side of the fixed members 43 away from the connector 23. Moreover, the non-display-function assembly 30 is secured to the base plate 40. As shown in FIG. 13 and FIG. 14, the non-display-function assembly 30 is disposed on a side of the fixed members 43 away from the connector 23, that is, the non-display-function assembly 30 is disposed on the edge of the second support plate 22. The non-display-function assembly 30 is fixed on a side surface of the base plate 40 toward to the flexible display screen 10. The mainboard is disposed in the base plate 40, and the non-display-function assembly 30 may directly be electrically connected to the mainboard in the base plate 40.

Figure 15:
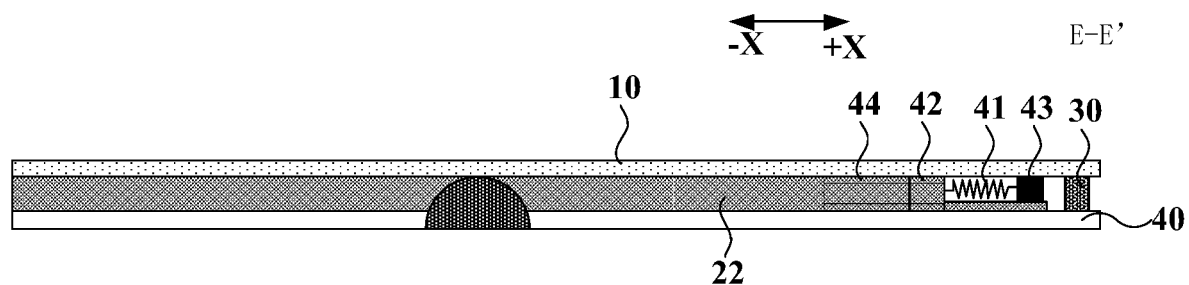
FIG. 15 is another cross sectional view of the foldable display device in an unfolded state along E-E' line of FIG. 12.

In an embodiment, the fixed members 43 are secured to the second support plate 22. As shown in FIG. 15, the difference from FIG. 13 is that the fixed members 43 are disposed on the second support plate 22 and secured to the second support plate 22. Understandably, the position arrangements of the fixed members 43 shown in the drawings are only examples, and the positions of the fixed members 43 may be reasonably arranged by related staff according to the product requirements and are not limited to the positions shown in FIG. 13 and FIG. 15.

In an embodiment, the second support plate is provided with an opening. At least a part of the sliding member is in the opening.

As shown in FIG. 12, the sliding members 42 are secured to the second part 12 of the flexible display screen 10. When the flexible display screen 10 is switched between the unfolded state and the folded state, the sliding members 42 slide as the flexible display screen 10 slides. In an embodiment, each sliding member 42 is clamped in a respective sliding rail 44 of the second support plate 22 and moves in the respective sliding rail 44. Each sliding rail 44 described herein is a respective opening disposed on the second support plate 22 for each sliding member 42 to slide. At least a part of each sliding member 42 is in the respective opening, so each sliding member 42 slides in the respective opening as the state of the foldable display device changes. The extension direction of the opening is parallel to the X direction.

In an embodiment, the openings are disposed in the second support plate 22 and closed to a first edge of the second support plate 22, but do not run through the first edge of the second support plate 22. The first edge is the side edge of the second support plate 22 toward the non-display-function assembly 30. Two ends of each opening are inside the second support plate 22, so the sliding members 42 slide inside the second support plate 22 all along. Each opening limits the maximum sliding positions of the respective sliding member 42 in the −X direction and the +X direction. Understandably, the size of the opening needs to meet the conditions described below. In the folded state, after the sliding members 42 slide in the −X direction, the flexible display screen 10 no longer covers the non-display-function assembly 30. In the unfolded state, after the sliding members 42 slide in the +X direction, the flexible display screen 10 totally covers the non-display-function assembly 30.

In an embodiment, the openings are disposed inside the second support plate 22 and run through the first edge of the second support plate 22. One end of the opening is disposed inside the second support plate 22 and the other end is disposed on the first edge of the second support plate 22. When each sliding member 42 slides in the respective opening of the second support plate 22, each opening limits the maximum sliding position of the respective sliding member 42 in the −X direction, but the second end of each opening runs through the second support plate 22, so the maximum sliding position of the respective sliding member 42 in the +X direction is not limited. In this case, the maximum sliding position of each sliding member 42 in the +X direction is effected by the respective elastic member 41. Understandably, the size of the opening needs to meet the conditions described below. In the folded state, after the sliding members 42 slide in the −X direction, the flexible display screen 10 no longer covers the non-display-function assembly 30. In the unfolded state, after each sliding member 42 slides in the +X direction limited by the respective opening and/or the respective elastic member 41, the flexible display screen 10 needs to totally cover the non-display-function assembly 30.

In an embodiment, the opening is a bar-shaped sliding rail. Each sliding member is connected to the second support plate at the respective opening. In an embodiment, the cross section of the sliding member is I-shaped.

Figure 16:
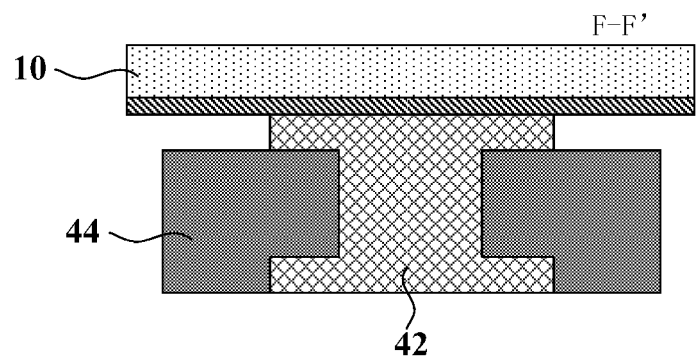
FIG. 16 is a cross sectional view of a sliding member of the foldable display device along F-F' line of FIG. 12.

FIG. 16 is a cross sectional view of the sliding member along F-F' line of FIG. 12. In an embodiment, the sliding members 42 are I-shaped. Each bar-shaped sliding rail 44 clamps the respective I-shaped sliding member 42 to enable each I-shaped sliding member 42 to slide in the respective bar-shaped sliding rail 44. The sliding members 42 are secured to the flexible display screen 10 through adhesive layers, so when the foldable display device is folded or unfolded, the state switch of the foldable assembly 20 enables the flexible display screen 10 and the sliding members 42 slide synchronously as a whole. The bending from the unfolded state to the folded state is taken as an example, the left side remains stationary and the second part 12 of the flexible display screen 10 on the right side slides to the left. Each I-shaped sliding member 42 combined with the respective sliding rail 44 on the foldable assembly 20 of the overall device, so as to ensure the flexible display screen 10 to move smoothly in the X direction. Meanwhile, each I-shaped sliding member 42 is connected to the respective elastic member 41 to ensure that the screen may be flattened from the folded state to the unfolded state.

In other embodiments, the sliding members 42 are T-shaped, and are not limited to this.

In an embodiment, the foldable display device further includes a connecting plate. Multiple sliding members are provided. The multiple sliding members are spaced apart along the first direction, and the multiple sliding members are connected to the connecting plate.

Figure 17:
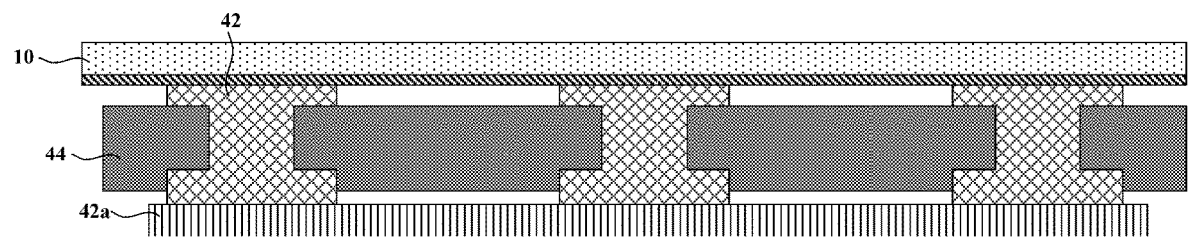
FIG. 17 is a schematic diagram of connection multiple sliding members in a foldable display device, according to an embodiment of the present disclosure.

As shown in FIG. 17, three sliding members 42 are provided and are spaced apart along the first direction. The sliding members 42 are connected through a connecting plate 42a. The multiple sliding members 42 are secured to the upper surface of the connecting plate 42a. The connecting plate 42a may further move relative to the second support plate 22, so when the foldable display device is switched between the folded state and the unfolded state, the connecting plate 42a may slide relative to the second support plate 22. In an embodiment, the connecting plate 42a may enable the multiple sliding members 42 to slide synchronously, so as to ensure that the sliding positions of the multiple sliding members 42 are consistent all along and avoid the local folds of the flexible display screen 10 in the process of sliding. In other embodiments, the quantity and the intervals of the sliding members 42 may be reasonably arranged by related staff according to the product requirements.

Exemplarily, based on the above solution, in an embodiment, the flexible display screen includes a first edge and a second edge opposite to each other in a second direction. The second edge is disposed on a side of the second part away from the bendable part and the second edge is straight. The second direction is perpendicular to the first direction.

Figure 18:
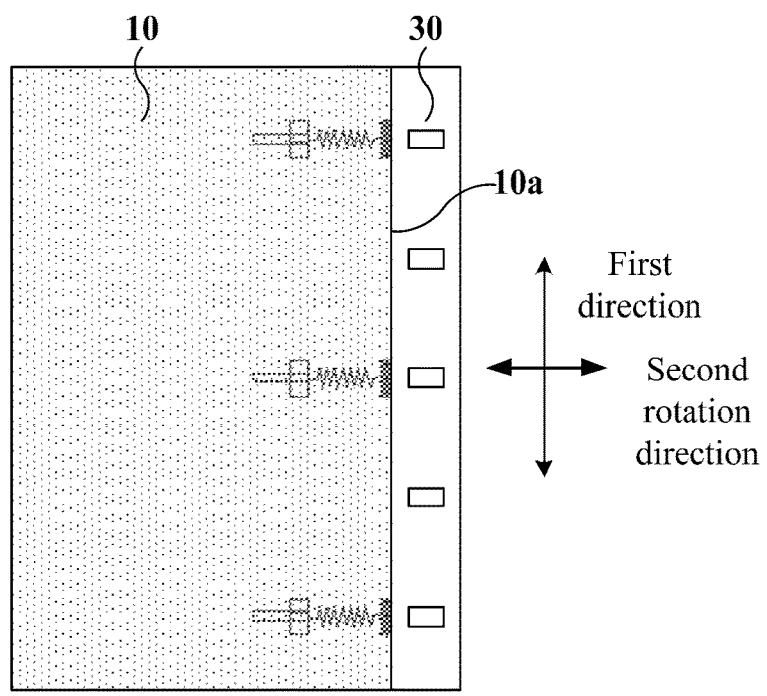
FIG. 18 is a diagram of a foldable display device in a folded state according to another embodiment of the present disclosure.

FIG. 18 is a top view of the foldable display device shown in FIG. 12 in the folded state. The flexible display screen 10 no longer covers the non-display-function assembly 30 after being folded. The flexible display screen 10 includes a first edge and a second edge 10a opposite to each other in the second direction. The second edge 10a is disposed on a side of the second part away from the bendable part 13 and the second edge 10a is straight. Thus, in the foldable display device in the unfolded state, the second edge 10a of the flexible display screen 10 totally covers the non-display-function assembly 30. For the foldable display device in the folded state, the second edge 10a of the flexible display screen 10 is straight and no longer covers the non-display-function assembly 30.

The reference numeral 30 shown in FIG. 18 refers to the non-display-function assembly 30, here may refer to a non-display-function area provided with non-display-function devices or structures. In the non-display-function area, the non-display-function devices or structures of the foldable display device, for example, a camera, a light sensor, a distance sensor, a volume button and a shutdown button, may be integrated. Thus, in the unfolded state, the flexible display screen 10 covers the non-display-function assembly 30 to achieve a full screen.

Exemplarily, based on the above solution, in an embodiment, the flexible display screen 10 includes a first side and a second side opposite to each other in the second direction. The second side is a side of the second part 12 away from the bendable part 13. The second side of the flexible display screen 10 is provided with a notch. In the folded state, the notch leaves the non-display-function assembly 30 exposed. In an embodiment, in the unfolded state, the second side of the flexible display screen 10 bends toward a direction in which the second support plate 22 is away from the second part 12, to enable the notch to be disposed on a side of the non-display-function assembly 30 away from the connector 23.

Figure 19:
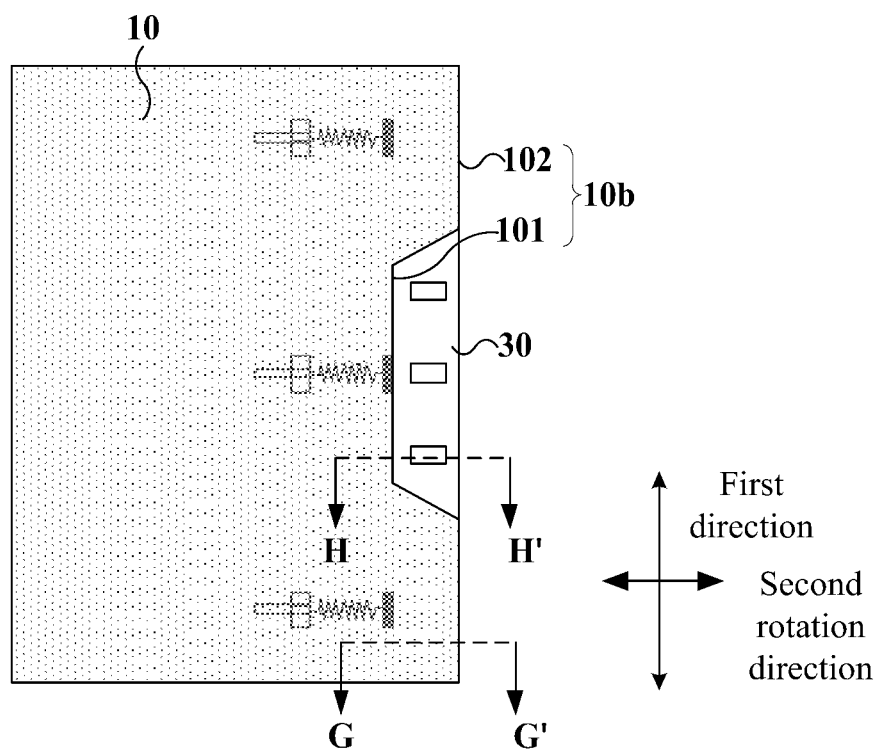
FIG. 19 is a diagram of a foldable display device in a folded state according to another embodiment of the present disclosure.
Figure 20:
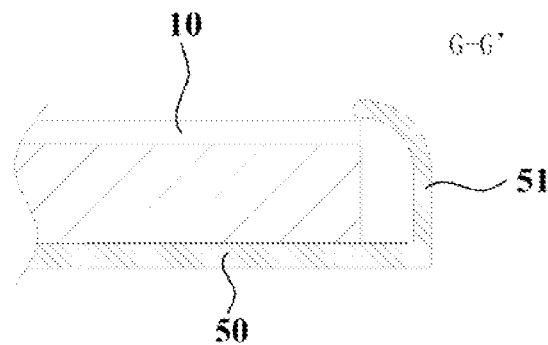
FIG. 20 is a cross sectional view of the foldable display device along G-G' line of FIG. 19.
Figure 21:
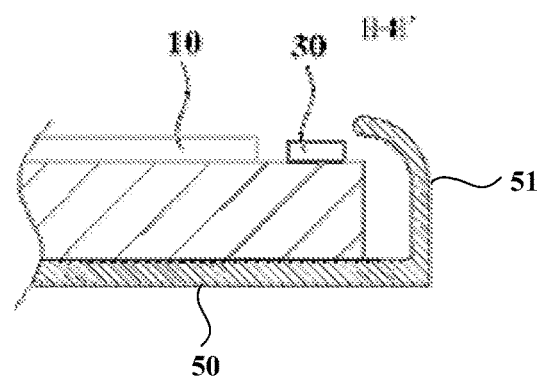
FIG. 21 is a cross sectional view of the foldable display device along H-H' line of FIG. 19.

FIG. 19 is a top view of the foldable display device in the folded state, FIG. 20 is a cross sectional view along G-G' line of FIG. 19 and FIG. 21 is a cross sectional view along H-H' line of FIG. 19. The flexible display screen 10 no longer covers the non-display-function assembly 30 after being folded. The flexible display screen 10 includes a first side and a second side 10b opposite to each other in the second direction. The second side 10b is disposed on a side of the second part 12 away from the bendable part 13. The second side 10b is provided with a notch 101 and a side 102 outside the notch 101. The area of the foldable assembly 20 corresponding to the notch 101 of the second side 10b is provided with the non-display-function assembly 30. In the folded state, the notch 101 leaves the non-display-function assembly 30 exposed. In an embodiment, the side 102 outside the notch 101 of the second side 10b is straight and the side 102 is flush with the edge on the same side of the foldable display device. In other embodiments, the side 102 of the second side of the flexible display screen 10 may have a bending, to facilitate guiding the second side of the flexible display screen 10 to bend toward a direction in which the second support plate 22 is away from the second part 12 in the process of unfolding the foldable display device.

Figure 22:
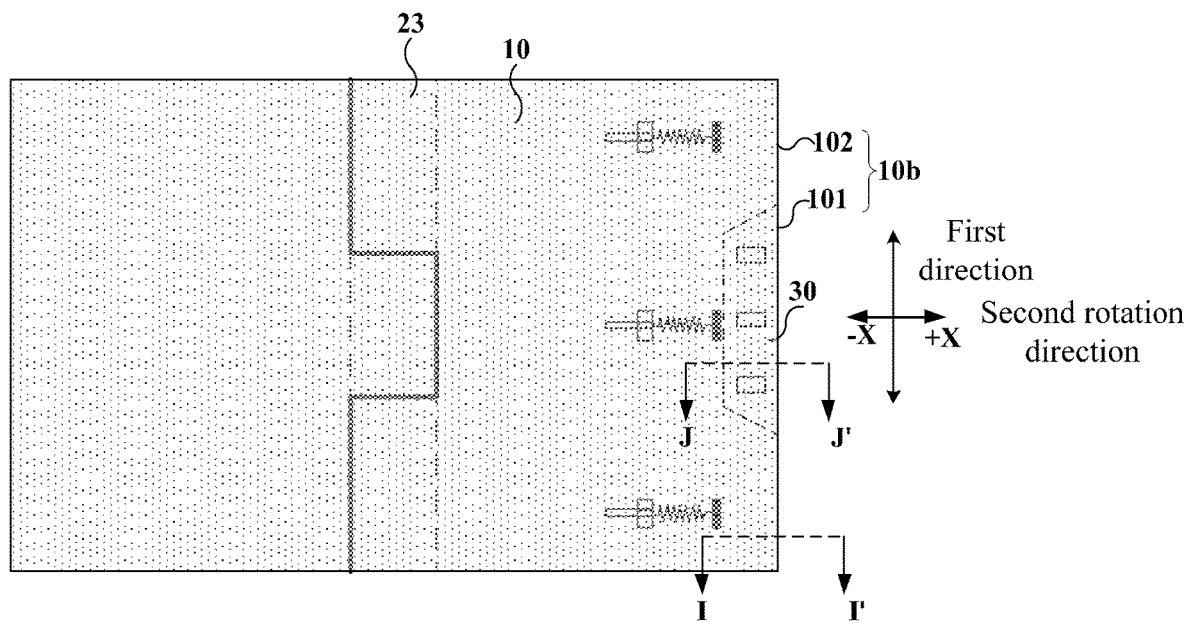
FIG. 22 is a diagram of FIG. 19 in an unfolded state.
Figure 23:
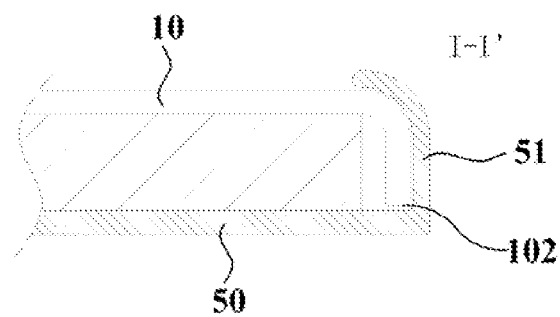
FIG. 23 is a cross sectional view of the foldable display device along I-I' line of FIG. 22.
Figure 24:
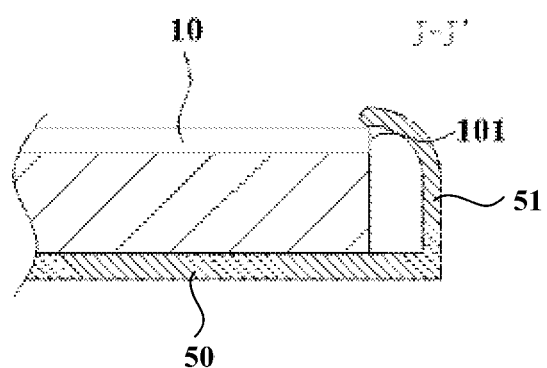
FIG. 24 is a cross sectional view of the foldable display device along J-J' line of FIG. 22.

FIG. 22 is top view of the foldable display device shown in FIG. 19 in the unfolded state, FIG. 23 is a cross sectional view along I-I' line of FIG. 22, and FIG. 24 is a cross sectional view along J-J' line of FIG. 22. The flexible display screen 10 includes a first side and a second side 10b opposite to each other in the second direction. The second side 10b is disposed on a side of the second part 12 away from the bendable part 13. The second side 10b is provided with a notch 101 and a side 102 outside the notch 101. When the foldable display device is switched from the folded state to the unfolded state, the flexible display screen 10 slides relative to the second support plate 22 in the +X direction. The flexible display screen 10 totally covers the non-display-function assembly 30 after being unfolded. The notch 101 of the second side 10b of the flexible display screen 10 is disposed on a side of the non-display-function assembly 30 away from the connector 23. The side 102 outside the notch of the second side 10b of the flexible display screen 10 bends toward a direction in which the second support plate 22 is away from the second part 12. In this case, the display surface of the foldable display device covers the non-display-function assembly 30, so the screen-to-body ratio is improved. In an embodiment, the notch 101 of the second side 10b of the flexible display screen 10 at least may be flush with edge on the same side of the foldable display device. In other embodiments, the notch 101 of the second side of the flexible display screen 10 may bend toward a direction in which the second support plate 22 is away from the second part 12.

In an embodiment, the foldable display device further includes a shell. The shell covers a side of the foldable assembly 20 facing away from the flexible display screen 10, and the shell includes a first sidewall. The first wall is disposed on a side of the non-display-function assembly 30 away from the connector 23. In the unfolded state, the second side of the flexible display screen 10 bends to an inner side of the first sidewall. The first wall includes a bending guide part. The bending guide part is provided with an arc-shaped inner edge.

As shown in FIG. 20, FIG. 21, FIG. 23 and FIG. 24, the foldable display device further includes a shell 50. A first sidewall 51 of the shell 50 is disposed on a side of the non-display-function assembly 30 away from the connector 23. In the unfolded state, the second side of the flexible display screen 10 bends to the inner side of the first wall. The first wall includes a bending guide part and the bending guide part is provided with an arc-shaped inner edge.

In the unfolded state, the flexible display screen 10 totally covers the non-display-function assembly 30, so the side 102 outside the notch 101 of the second side 10b may bend to the inner side of the first wall 51 of the shell 50 of the foldable display device. In this embodiment, the shell 50 is provided, so the side 102 outside the notch of the flexible display screen 10 may bend to the inner side of the first wall 51 of the shell 50 to avoid the damages caused by the exposure of the side 102 outside the notch and the effects on the display performance.

In the unfolded state, the flexible display screen 10 bends towards the first wall 51 of the shell 50 at the second side. In the folded state, the flexible display screen 10 slides in the −X direction and the edge of the second side of the flexible display screen 10 is flush with the edge of the foldable display device. In an embodiment, the overall device outer shell 50 is provided with an arc-shaped inner edge on a position corresponding to the flexible display screen 10 to enable the edge of the second side of the flexible display screen 10 to be stretched and shrink freely along the arc-shaped inner edge without any damage to the flexible display screen 10. Based on this, when there are only a few cameras, the improvement of the screen-to-body ratio can be ensured.

In the foldable display device described above, the connector 23 of the foldable assembly 20 is designed as a rotating shaft without compensatory structure, for example, may be a single shaft structure with the advantages of simple structure, less parts and long life, or may be a hinge shaft structure, or may be an outward curvature hinge structure and the support plates of the foldable assembly may be a whole with the intermediate shaft of the hinge, which supports the flexible display screen together. In an embodiment, the hinge is not limited to the design of the single shaft with the hinge structure. Under the premise of ensuring the bending radius, the design of the hinge with support structure may be changed arbitrarily and simple hinge without compensatory structure is enough. The complexity of the rotating shaft structure is reduced.

In this embodiment of the present disclosure, the rotating shaft of the foldable display device may be a whole with the support plates. The first part 11 of the flexible display screen 10 is fixed on the first support plate 21 and the second part 12 is connected to the second support plate 22 able to be stretched and shrink through the multiple elastic members 41. When the state of the foldable display device is switched, the elastic members 41 can ensure that the flexible display screen 10 on a side able to be stretched and shrink can slide towards the first part 11 of the flexible display screen 10 on the fixed side after the screen is folded.

In this embodiment of the present disclosure, the foldable display device achieves a full screen display in the unfolded state and the back surface of the display screen is a flat plane, so that the user experience is improved. In the folded state, the foldable display device can enable the non-display-function assembly 30 such as the camera or the button module to be exposed, so the operation and the usage are convenient. In the unfolded state, the non-display-function assembly 30 such as the camera is covered to achieve higher screen-to-body ratio.

What is claimed is:

1. A foldable display device, comprising:
a flexible display screen, comprising a first part, a second part and a bendable part, wherein the bendable part is disposed between the first part and the second part;
a foldable assembly, comprising a first support plate, a second support plate and a connector, wherein the first support plate supports the first part, the second support plate supports the second part, wherein the first support plate is connected to the second support plate through the connector, wherein the connector is a folding shaft, and wherein an extension direction of the folding shaft is a first direction; and
a non-display function assembly disposed on a side of the second support plate away from the connector;
wherein working states of the foldable display device comprise an unfolded state and a folded state;
wherein in the unfolded state, the first support plate and the second support plate are disposed on two opposite sides of the connector respectively, wherein the flexible display screen covers the first support plate, the connector, the second support plate and the non-display function assembly;
wherein in the folded state, the first part and the second part of the flexible display screen overlap, wherein the first support plate and the second support plate overlap and are disposed between the first part and the second part, and wherein a part of the flexible display screen on a side of the second support plate which is away from the first support plate does not cover the non-display function assembly;
wherein the folding shaft is a rotating shaft; and
wherein the first support plate in the foldable assembly comprises a first connecting portion, sleeved on the rotating shaft to enable the first support plate to be rotatable around the rotating shaft; or wherein the second support plate comprises a second connecting portion, sleeved on the rotating shaft to enable the second support plate to be rotatable around the rotating shaft.

2. The foldable display device of claim 1,
wherein the first part is secured to the first support plate; and wherein in a process of switching the foldable display device between the unfolded state and the folded state, the second part slides relative to the second support plate, in a sliding direction perpendicular to the first direction.

3. The foldable display device of claim 1, further comprising an elastic member, wherein
in the folded state, the elastic member exerts a force pulling the second part of the flexible display screen away from the bendable part.

4. The foldable display device of claim 3, further comprising a sliding member and a fixed member,
wherein the elastic member comprises a first end and a second end opposite to each other, the first end is connected to the sliding member, wherein the second end is connected to the fixed member, and wherein the sliding member is disposed between the connector and the fixed member;
wherein the sliding member is secured to the second part of the flexible display screen, and
wherein in a process of switching the foldable display device between the unfolded state and the folded state, the sliding member slides relative to the second support plate in a sliding direction perpendicular to the first direction.

5. The foldable display device of claim 4, further comprising a base plate,
wherein the base plate is disposed on a side of the second support plate facing away from the second part, and wherein the fixed member is secured to the base plate.

6. The foldable display device of claim 5, wherein the non-display function assembly is disposed on a side of the fixed member away from the connector, and wherein the non-display function assembly is secured to the base plate.

7. The foldable display device of claim 4, wherein the fixed member is secured to the second support plate.

8. The foldable display device of claim 4, wherein the second support plate is provided with an opening, and at least a part of the sliding member is in the opening.

9. The foldable display device of claim 8, wherein the opening is a bar-shaped sliding rail, and wherein the sliding member is connected to the second support plate at the opening capable of sliding.

10. The foldable display device of claim 9, wherein a cross section of the sliding member is I-shaped.

11. The foldable display device of claim 4, further comprising a connecting plate, wherein
a plurality of sliding members disposed spaced apart along the first direction and connected to the connecting plate.

12. The foldable display device of claim 1, wherein the flexible display screen comprises a first edge and a second edge opposite to each other in a second direction, wherein the second edge is straight and disposed on a side of the second part away from the bendable part; and
wherein the second direction is perpendicular to the first direction.

13. The foldable display device of claim 1,
wherein the flexible display screen comprises a first side and a second side opposite to each other in a second direction, wherein the second side is a side of the second part away from the bendable part, and the second side of the flexible display screen is provided with a notch; and
wherein in the folded state, the notch leaves the non-display function assembly exposed.

14. The foldable display device of claim 13,
wherein in the unfolded state, the second side of the flexible display screen bends toward a direction in which the second support plate is away from the second part, to enable the notch to be disposed on a side of the non-display function assembly away from the connector.

15. The foldable display device of claim 14, further comprising a shell,
wherein the shell covers a side of the foldable assembly facing away from the flexible display screen, wherein the shell comprises a first sidewall disposed on the side of the non-display function assembly away from the connector;
wherein in the unfolded state, the second side of the flexible display screen bends to an inner side of the first sidewall; and
wherein the first sidewall comprises a bending guide part having an arc-shaped inner edge.

16. The foldable display device of claim 1, wherein the non-display function assembly comprises at least an image acquisition unit.

* * * * *